(12) United States Patent
Ferguson et al.

(10) Patent No.: US 12,062,142 B2
(45) Date of Patent: Aug. 13, 2024

(54) VIRTUAL ENVIRONMENT

(71) Applicants: Cameron Hunter Yacos Ferguson, Kennesaw, GA (US); Callum Cortlandt Yacos Ferguson, Kennesaw, GA (US)

(72) Inventors: Cameron Hunter Yacos Ferguson, Kennesaw, GA (US); Callum Cortlandt Yacos Ferguson, Kennesaw, GA (US)

( * ) Notice: Subject to any disclaimer, the term of this patent is extended or adjusted under 35 U.S.C. 154(b) by 339 days.

(21) Appl. No.: 17/537,748

(22) Filed: Nov. 30, 2021

(65) Prior Publication Data

US 2022/0253808 A1 Aug. 11, 2022

Related U.S. Application Data

(60) Provisional application No. 63/119,262, filed on Nov. 30, 2020.

(51) Int. Cl.
*G06T 19/00* (2011.01)
*G06F 3/01* (2006.01)

(52) U.S. Cl.
CPC ............ *G06T 19/006* (2013.01); *G06F 3/017* (2013.01)

(58) Field of Classification Search
None
See application file for complete search history.

(56) References Cited

U.S. PATENT DOCUMENTS

| 6,215,498 B1 * | 4/2001 | Filo | G06T 15/00 |
| | | | 345/473 |
| 2013/0293468 A1 * | 11/2013 | Perez | G06F 3/033 |
| | | | 345/158 |

* cited by examiner

*Primary Examiner* — Robert J Craddock
(74) *Attorney, Agent, or Firm* — Blake E. Vande Garde; AVEK IP, LLC (57) ABSTRACT

Methods for parameterizing virtual spaces by matching virtual objects to physical objects, creating shared virtual spaces for users to meet, loading in virtual media objects from personal computing devices, selecting and interacting with virtual objects in virtual spaces, and activating virtual media representations for consumption are described herein.

20 Claims, 5 Drawing Sheets handheld device laptop or desktop computer

Save to server.

Figure 1: Swipe desk or any other real-world surface.
The tilted surface is further bounded after finding the orientation.

Figure 2: Surfaces at different angles.

Figure 3: Internet.

Figure 4: Save to server.

Figure 5: Pinch pull point.

Figure 6: Pinch pull wire.

Figure 7: Play object.

Figure 8: Tablet with button.

Figure 9: Recessed inverse button.

VIRTUAL ENVIRONMENT

CROSS REFERENCE TO RELATED APPLICATION

This application claims the priority of the provisional application Ser. No. 63/119,262 filed Nov. 30, 2020. Applicants hereby incorporate by reference the entire content of provisional application Ser. No. 63/119,262.

FIELD OF INVENTION

This invention pertains to virtual meeting spaces which allow one or more users to interact within that virtual reality environment.

BACKGROUND OF THE INVENTION

Visions of immersive simulated experiences likely date back far before the industrial revolution. Some of the first modern devices which can be identified are separately the stereoscopic View-Master from 1939 and the Sensorama patent from 1962. Only in the latter half of the previous decade have mobile computing platforms evolved and developed enough to provide a virtual reality (VR) experience comparable to that of current video games. The first progression was with the development of high resolution and density displays for mobile devices which can be re-purposed to build VR headsets which tether to a computer to render images for the user. The second development was the system on chip (SoC) devices which allow for the virtual reality headset to provide its own computing power and thus removes the need to be tethered to an external computer. One further development is in the field of deep learning applied to pose estimation which allows cameras onboard the VR headset to estimate the spatial position and orientation of the user's hands, removing the need for specialized controllers to interact with objects in VR in a meaningful way.

This new platform (mobile VR device with hand tracking) then requires the development of new frameworks (conceptual and technical) to handle and play media solo or with other users. Previous innovations on the technical side include the development of pointer and input devices such as the mouse and keyboard and their subsequent digitization into multi gesture touch screens and touch keyboards. Conceptual frameworks to handle media include the development of social platforms built around media feeds, subscriptions, and recommendation engines. These solutions require analogous counterparts adapted to the peculiarities of VR.

Thus, there is clearly a need for a virtual reality environment and platform which permits one or more users to meet and interact with a plurality of media within that VR environment.

SUMMARY OF THE INVENTION

The instant invention relates to a framework to allow a user to match virtual surfaces to real ones and then share this surface with other users. Prior to entering the virtual space, each user can mark various media using other computing devices to appear on the desk as simulated virtual objects. These objects can then be activated to engage with the media similar to playing a DVD or an online video. The instant invention further includes a general gesture which may be used by each user to aid in handling virtual objects which can be applied to these media representations or other virtual objects. The instant invention also includes a virtual button which heightens the immersion experience.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 1 illustrates the Swipe Desk feature of the instant invention.

FIG. 2 illustrates the variety of surfaces that the Swipe Desk feature can be applied to FIG. 2A illustrates a horizontal surface FIG. 3 illustrates how two users in separate physical locations can meet in the same virtual environment and share a desk.

FIG. 9 illustrates a user's ability to activate a virtual object or media in the virtual environment by pressing a virtual button on the object.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The instant invention includes a system for providing a virtual reality (VR) online meeting platform. The system includes one or more processors, a computer readable memory and a computer readable storage medium operatively associated with a computing device. The computing device can be any device known in the art including, but not limited to, a desktop computer, a laptop computer, a tablet, a smart phone, a television, or any combination thereof. The system includes a motion capture device capable of recognizing and detecting a hand of a user and movement and gestures by the hand. Any motion capture device or system known in the art can be used by the system. The motion capture device can be operatively associated with a VR headset worn by the user. One example of an acceptable motion capture device is the Quest 2 by Oculus (Facebook Technologies, LLC, Menlo Park, CA, USA). Any kind of motion tracking method, software or hardware known in the art may be incorporated. One example is inside-out tracking which is a method of positional tracking commonly used in VR technologies. Inside-out tracking is designed specifically for tracking the position of head-mounted displays (HMDs) and motion controller accessories. It differentiates itself from outside-in tracking by the location of the cameras or other sensors that are used to determine the object's position in space. In inside-out positional tracking, the camera or sensors are located on the device being tracked (e.g., HMD) while in outside-in the sensors are placed in a stationary location around the device being tracked. A VR device using inside-out tracking looks out to determine how its position changes in relation to its environment. When the headset moves, the sensors readjusts its place in the room and the virtual environment responds accordingly in real time. This type of positional tracking can be achieved with or without markers placed in the environment.

The cameras (or any other optical sensors) that are placed on the HMD observe features of the surrounding environment. When using markers, these are designed to be easily detected by the tracking system and placed in a specific area. These fiducial markers include primitive shapes like points, squares, and circles. QR codes are an example of positional markers that can be placed in the outside world to serve as reference points for the tracking camera. Inside-out positional tracking can also be achieved using infra-red (IR) markers and a camera that is sensitive to this type of light. With marker-less inside-out tracking—a method based on natural features—distinctive characteristics that exist in the environment are used to determine position and orientation. The system's algorithms identify specific images or shapes and uses them to calculate the device's position in space. Data from accelerometers and gyroscopes can also be used to increase the precision of positional tracking.

The system includes programming instructions to create a copy of the hand within a virtual reality environment based on data collected by the motion capture device. The system includes programming instructions to obtain a digital blueprint of a desk or table in a real-world environment wherein the motion capture device recognizes a gesture executed by the hand of the user across the desk or table and creates the digital blueprint of the desk or table using the gesture and programming instructions to create a copy of the desk or table within a VR environment based on the digital blueprint.

Figure 1A:
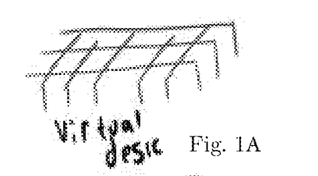
FIG. 1A illustrates a virtual desk
Figure 1B:
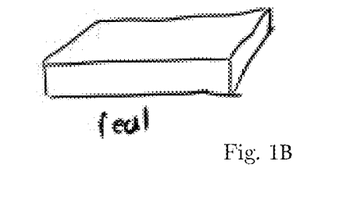
FIG. 1B illustrates an actual, real desk
Figure 1C:
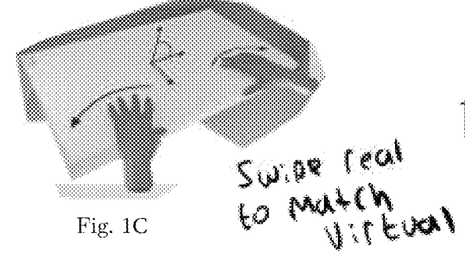
FIG. 1C illustrates a user swiping an actual, real desk to define the virtual desk in the virtual environment
Figure 1D:
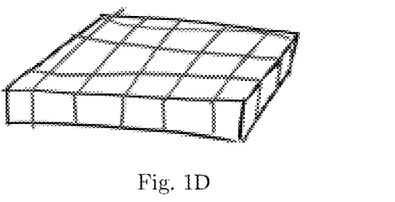
FIG. 1D illustrates a fully defined virtual desk in the virtual environment
Figure 1E:
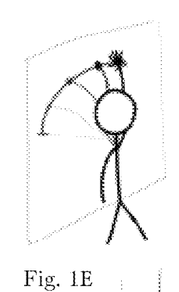
FIG. 1E illustrates an actual, real wall
Figure 1F:
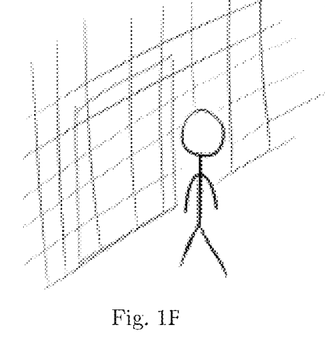
FIG. 1F illustrates a virtual wall
Figure 1G:
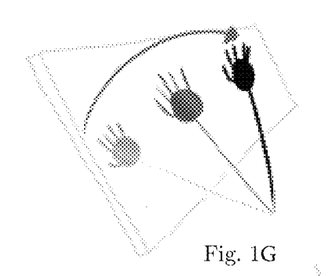
FIG. 1G illustrates an angled surface in the real world
Figure 1H:
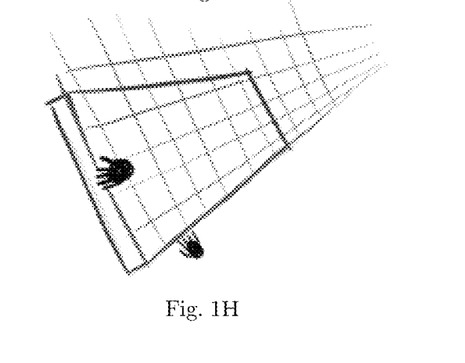
FIG. 1H illustrates an angled surface in the virtual environment
Figure 2A:
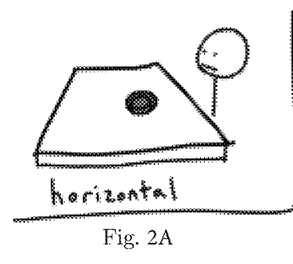
Figure 2B:
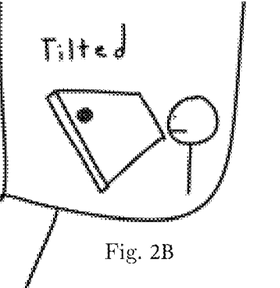
FIG. 2B illustrates an angled or tilted surface
Figure 2C:
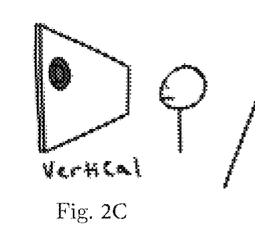
FIG. 2C illustrates a vertical surface

The acquisition of a digital blueprint of a desk, table or any other collaborative surface in a real-world environment is illustrated in FIG. 1. Collaborative surfaces include any desk, table, wall, easel, horizontal surface, angled or tilted surface, vertical surface, or similar object or surface (See FIG. 2). A swiping gesture is used by a user to match a virtual desk's coordinates to a physical desk the user is sitting in front of and gesturing (FIGS. 1A-1D). Performing this matching heightens the sense of immersion since now the user will feel the presence of the real desk when their virtual hands interact with gestures on the virtual desk. For example, when this matching is done correctly, finger painting on the virtual desk will have the proper sensation given by the real fingers interacting with the real desk. Without performing a match, the users' real fingers are able to pass through the virtual desk and it provides no proper feedback. The virtual fingers and virtual desk are physically simulated so that they cannot pass through one another. The matching of the virtual desk to the real desk precludes the real and virtual hands from being out of sync due to a virtual obstruction. To perform the match, the user places their thumbs on the side of the desk and their other fingers flatly on top of the desk. The user then makes a quick swiping motion sideways. During the swiping motion, an array of points is recorded. From the thumb data, a line can be derived which determines the orientation of the edge of the table, the distance and angle from the user. The array of data from the other fingers is used to determine what height the real table is from the ground. Using the totality of the data gathered during the swiping motion, the real table can be spatially located relative to the virtual environment. The application then places a virtual table at that location, thus matching a virtual table to a real table. The acquisition of a digital blueprint of a surface is not constrained to only desks although much of the discussion is in these terms. FIGS. 1 and 2 indicate how other surfaces can be matched by similar swiping gestures. In the case of a wall (FIGS. 1E and 1F), a swiping gesture is sufficient to match orientation but not extent of the wall. For surfaces like the tilted desk (FIGS. 1G and 1H) where both the orientation and bounds of the surface are important, after parameterizing the orientation of the surface, the edges can be touched to parameterize the blueprint to have a fixed boundary.

Figures 3A, 3B, 3C:
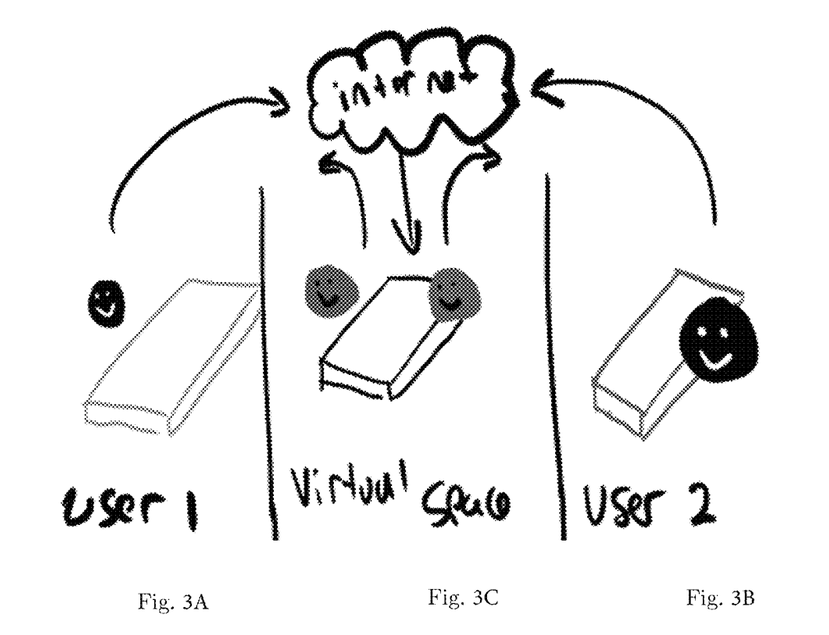
FIG. 3A illustrates a first user in a first physical location.
FIG. 3B illustrates a second user in a second physical location.
FIG. 3C illustrates the first user and the second user meeting one another at a virtual desk in the virtual environment.

The system can be employed by two or more users to individually create a copy of a desk or table within the VR environment and those individual desks or tables are then combined or merged within the VR environment to create a shared virtual desk or table. FIG. 3 illustrates how two users in different locations with different tables can each match their own table separately and then share a virtual environment over the internet. Each user performs the steps discussed previously and illustrated in FIG. 1. The users can then send a request to meetup on a shared desk. Each user is then placed at a shared desk and then streams their own location, voice, etc. to each-other. This creates the illusion that each user is sitting at a shared desk across from the other user within the virtual environment.

Figure 4:
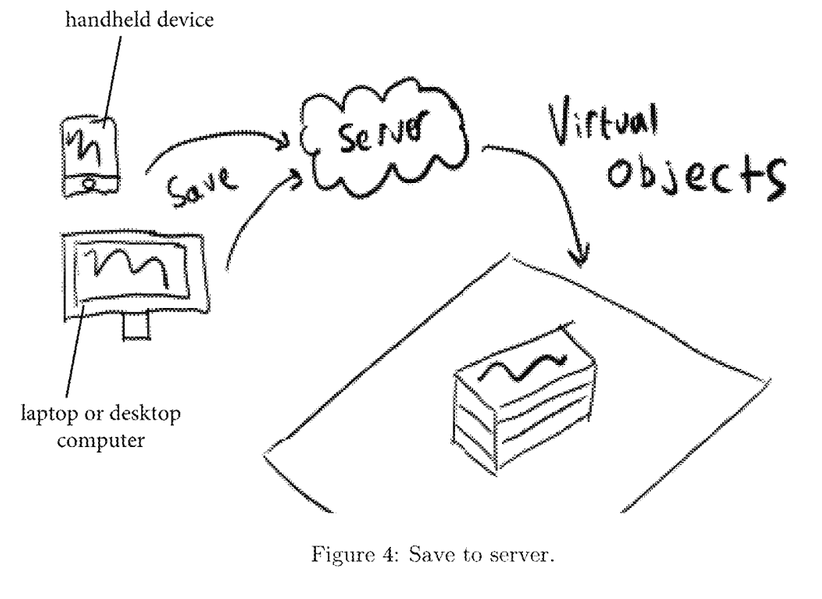
FIG. 4 illustrates how real-world computer devices are used to pre-load media as virtual objects on the virtual desk

The system can also include a media module, wherein said media module includes program instructions permitting a user to select media that they can store, view, and share with other users within the VR environment. The media can include pictures, paintings, photos, videos, games, 3D objects, articles, books, and the like. FIG. 4 illustrates how prior to two or more users meeting at a shared desk, each can use their computing device to pre-load media which can be bookmarked. This media can be tagged to appear in future meetings with other users. For example, if Susan marks items A and B to appear in a meeting with Bob and Bob marks items C and D to appear in a meeting with Susan, then next time Susan and Bob meet within the virtual environment at a virtual desk, then media items A, B, C, and D will appear on their shared virtual desk. The media can then be interacted with and consumed in the shared virtual space.

Figure 5:
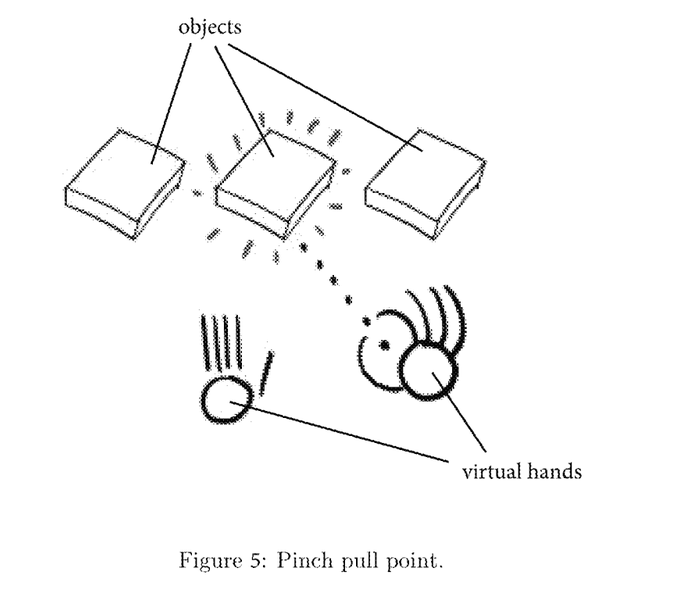
FIG. 5 illustrates a user's ability to select a virtual object in the virtual environment through a defined hand gesture.

The system can also include a selection module which includes program instructions permitting a user to select an object or media within the VR environment. The selection module is operatively associated with the motion capture device which recognizes a gesture executed by the hand of the user and selects the object or media using the gesture. FIG. 5 illustrates one embodiment of a user employing the selection module which allows a user can highlight an object which is potentially outside of their reach within the VR environment. The object to be highlighted is determined by casting an invisible ray from the user's virtual hand and determining which interactable object first intersects with this ray. The ray's orientation is determined as if the user was holding a laser pointer in their hand like a pen. The object which intersects with this ray is then highlighted to indicate that a selection has been made. The application only fires the ray cast and makes a selection when a certain gesture is performed. This gesture occurs when the user makes the hand shape as if they were holding an invisible laser pointer as a pen in a pinching orientation. If, for example, the user were to loosen the pinching gesture such that an invisible pen would fall out of their hand, then the application no longer tries to ray cast and intersect an object to highlight as a selection.

Figure 6:
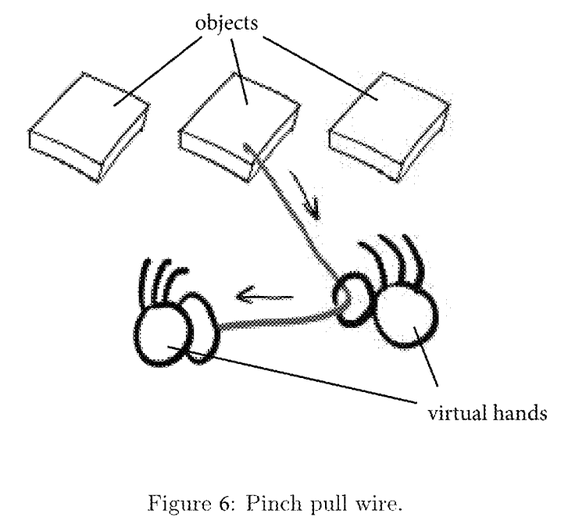
FIG. 6 illustrates a user's ability to virtually tether a selected object and "pull" that object closer to the user's perspective in the VR environment.

The system can also include a tether module which includes program instructions permitting a user to tether an object or media previously selected using the selection module described previously. The tether module is operatively associated with the motion capture device which recognizes a gesture executed by the hand of the user and tethers the object or media using the gesture. The tether module includes program instructions permitting the user to pull the object or media within reach of the virtual hand of the user in the VR environment. FIG. 6 illustrates one embodiment of a tether module which allows a user to attach a "wire" to an interactable object within the VR environment and then pull back the interactable object from a space potentially or actually outside of their reach within the VR environment. If the user has made a selection using the selection module described above, then they can progress to connect a "wire" or "string" which is pinched in their second hand which loops through a circle on their first hand and connects to the interactable object. All entities illustrated in FIG. 6 are physically simulated so now the user can drag back the interactable object analogous to reeling in a fish caught on a fishing rod. In one embodiment, when the user has made a selection with the selection module, a trigger region is generated. The trigger region is located near the location of the invisible laser pointer and can be about the size of a baseball. If the user virtually pinches in that region with their unused hand while the main hand continues to keep the virtual object selected, then a string is connected and looped through the main hand as illustrated in FIG. 6. The two hands and the virtual object are now all linked in a physically simulated way which allows for the user to pull objects within the VR environment closer to themselves.

Figure 7:
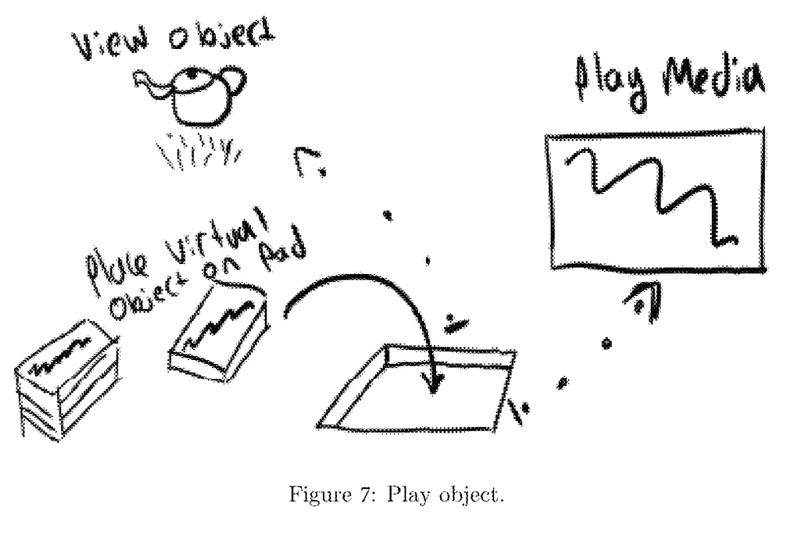
FIG. 7 illustrates a user's ability to activate a virtual object or media in the virtual environment.

The system can also include a viewing module which includes program instructions permitting a user to select media stored by the media module as a virtual media object and view it within the VR environment. FIG. 7 illustrates one embodiment of a viewing module within which the virtual media objects previously discussed can be activated to view the media which they represent or link to. The viewing module can include a "pad" on which media is placed in order to activate it or view it within the VR environment. When a media object is placed on the pad, it interpolates to rest upon it. When this has concluded, the media is then activated. As described previously, the media can include pictures, paintings, photos, videos, games, 3D objects, articles, books, and the like, like so depending on the type of media specific things will happen when activated. If the media represents a video, then that video may begin playing on a video screen within the VR environment. If the media is some 3D object, then that object could be displayed as a hologram hovering above the tablet or spawn onto the desk as an interactable physically simulated object. If the media represents a song, then the song will play (with or without video footage) within the VR environment and be audible to anyone connected to that environment. The viewing module may further include a menu option which is displayed for virtual media objects which include two or more types of media (i.e., music and video) and allows a user to select which type(s) of media are shared/displayed.

Figure 8:
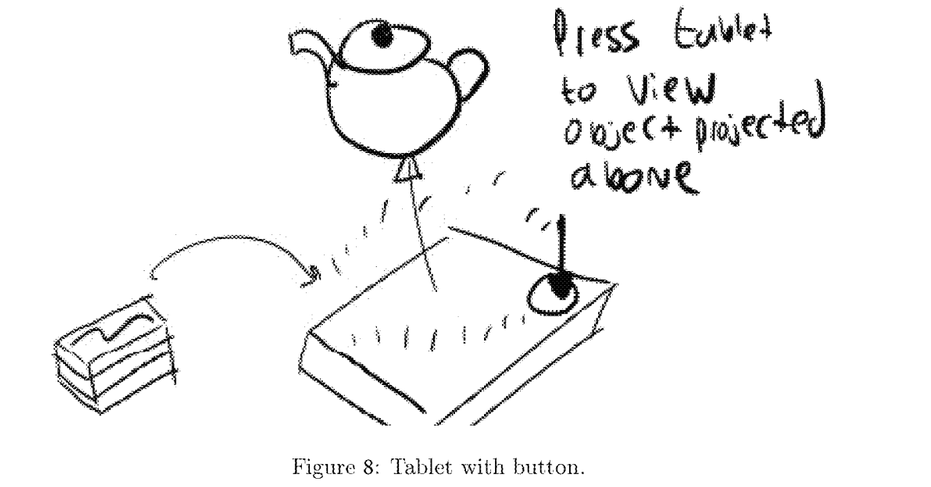
FIG. 8 illustrates a user's ability to activate a virtual object or media in the virtual environment by pressing a virtual button on the object.

The system can also include a button module which includes program instructions to create a button within the VR environment which is operatively associated with objects and/or media stored by the media module. The button module allows a user to press the button within the VR environment to activate the object and/or media. FIG. 8 illustrates that a media object can be activated by pressing a button on the media object. Rather than placing the object on a pad as illustrated in FIG. 7, some media objects may have a button or area on themselves which when interacted with activates the media as previously. The media object may then spawn a virtual object or display some photo, video, or internet link in a window above the media object. The button can then be pressed again to suppress the activated media object.

Figure 9A:
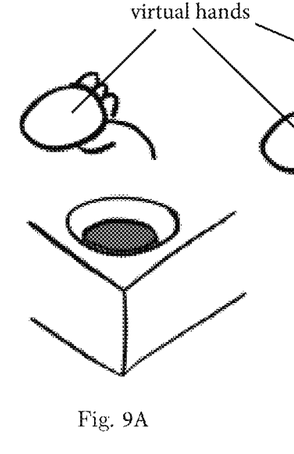
FIG. 9A illustrates a virtual hand above a virtual button.
Figures 9B, 9C:
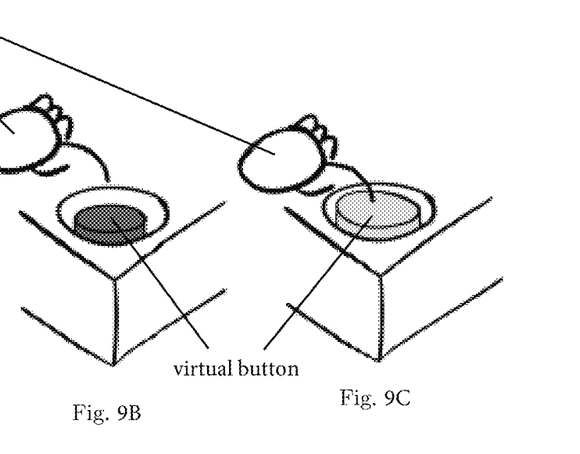
FIG. 9B illustrates a virtual hand moving toward a virtual button.
FIG. 9C illustrates a virtual hand moving toward and pressing a virtual button.

The system can also include a recessed button module which includes program instructions to obtain a digital blueprint of a recessed area on the desk or table in the real-world environment. The recessed button module is operatively associated with the motion capture device, which recognizes a gesture executed by the hand of the user across the desk, table or collaborative surface and creates the digital blueprint of the recessed area using the gesture. The recessed button module further includes programming instructions to create a copy of the recessed area within a VR environment based on the digital blueprint as well as programming instructions to create a recessed button within the VR environment which is operatively associated with objects and/or media stored by the media module. The VR recessed button couples to the matched collaborative surface. The VR recessed buttons can spawn at arbitrary positions on the collaborative surface. There is no corresponding recessed area in real life to which the recessed button corresponds. The recessed button, in addition to activating properties of media objects as described, can provide a hook to initiate and execute arbitrary computations upon activation. The user can press the recessed button within the VR environment to activate the object and/or media. FIG. 9 illustrates a recessed inverse button on a virtual surface which has been matched to a real surface. This button exists inside a cavity which has been cut out from the virtual surface. When a user's finger approaches the button, it responds in proportion by beginning to emerge from the cavity. The button meets the user's finger at the surface where it is activated. The problem with standard buttons which exist outside of some surface and are depressed by a virtual finger for activation is that there is no proper force feedback. The user expects some tactile feedback from such a standard button and so immersion is broken when these buttons are used in a virtual environment. The recessed button on a matched virtual surface has exactly the tactility expected since the button meets the user's finger exactly as their finger touches the real surface.

The instant invention also includes a method for providing a virtual reality (VR) online meeting platform comprising the steps of:
(a) providing a system comprising:
  i. one or more processors, a computer readable memory and a computer readable storage medium operatively associated with a computing device;
  ii. a motion capture device capable of recognizing and detecting a hand of a user and movement and gestures by the hand;
  iii. programming instructions to create a copy of the hand within a virtual reality environment based on data collected by the motion capture device;
  iv. programming instructions to obtain a digital blueprint of a desk or table in a real-world environment;
(b) creating a hand within the VR environment based on data collected by the motion capture device;
(c) obtaining a digital blueprint of the desk or table in a real-world environment by using the motion capture device to recognize a gesture executed by the hand of the user across the desk or table; and
(d) creating a copy of the desk, table, or other collaborative surface within a VR environment based on the digital blueprint using programming instructions to create a copy of the desk or table.

The method described above can include the motion capture device being operatively associated with a VR headset worn by the user.

The method described above can include operability allowing two or more users to each use the system to individually create a copy of a desk or table within the VR environment and those individual desks or tables are then merged or combined within the VR environment to create a shared desk or table.

The method described above can include a media module which includes program instructions permitting a user to select media that they can store, view, and share with other users within the VR environment. The media includes pictures, paintings, photos, videos, games, 3D objects, articles, books, and the like.

The method described above can include a selection module which includes program instructions permitting a user to select an object or media within the VR environment and wherein the motion capture device recognizes a gesture executed by the hand of the user and selects the object or media using the gesture.

The method described above can include a tether module which includes program instructions permitting a user to tether an object or media previously selected using the selection module. The motion capture device recognizes a gesture executed by the hand of the user and tethers the object or media using the gesture and program instructions permitting the user to pull the object or media within reach of the virtual hand of the user in the VR environment.

The method described above can include a viewing module which includes program instructions permitting a user to select media stored by the media module and view it within the VR environment.

The method described above can include a button module which includes program instructions to create a button within the VR environment which is operatively associated with objects and/or media stored by the media module and allow the user can press the button within the VR environment to activate the object and/or media.

The method described above can include a recessed button module which includes program instructions to obtain a digital blueprint of a recessed area on the desk or table in the real-world environment. The motion capture device recognizes a gesture executed by the hand of the user across the recessed area on the desk or table and creates the digital blueprint of the recessed area using the gesture. The module includes programming instructions to create a copy of the recessed area within a VR environment based on the digital blueprint and programming instructions to create a recessed button within the VR environment which is operatively associated with objects and/or media stored by the media module, allowing the user to press the recessed button within the VR environment to activate the object and/or media.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively disclosed herein suitably may be practiced in the absence of any element which is not specifically disclosed herein.

The invention claimed is:

1. A system for providing a virtual reality (VR) online meeting platform comprising:
   one or more processors, a computer readable memory, and a computer readable storage medium operatively associated with a computing device;
   wired or wireless access to one or more networks operatively associated with the computing device;
   a motion capture device capable of recognizing and detecting a hand of a user and movement and gestures by the hand;
   programming instructions to create a copy of the hand within a virtual reality environment based on data collected by the motion capture device;
   programming instructions to obtain a digital blueprint of a collaborative surface such as a desk or table in a real-world environment;
      wherein the motion capture device recognizes a gesture executed by the hand of the user across the desk or table and creates the digital blueprint of the desk or table using the gesture; and
   programming instructions to create a copy of the desk, table or collaborative surface within a VR environment based on the digital blueprint.

2. The system of claim 1 wherein the motion capture device is operatively associated with a VR headset worn by the user.

3. The system of claim 1 wherein two or more users each use the system to individually create a copy of a desk or table within the VR environment and those individual desks or tables are then combined within the VR environment to create a shared desk or table.

4. The system of claim 1 further comprising a media module, wherein said media module includes program instructions permitting a user to select media that they can store, view, and share with other users within the VR environment.

5. The system of claim 4 wherein the media includes: pictures, paintings, photos, videos, games, 3D objects, articles, or books.

6. The system of claim 1 further comprising a selection module:
   wherein said selection module includes program instructions permitting a user to select an object or media within the VR environment and wherein the motion capture device recognizes a gesture executed by the hand of the user and selects the object or media using the gesture.

7. The system of claim 1 further comprising a tether module:
   wherein said tether module includes program instructions permitting a user to tether an object or media previously selected using the selection module and wherein the motion capture device recognizes a gesture executed by the hand of the user and tethers the object or media using the gesture; and
   program instructions permitting the user to pull the object or media within reach of the virtual hand of the user in the VR environment.

8. The system of claim 1 further comprising a viewing module:
   wherein said viewing module includes program instructions permitting a user to select media stored by the media module and view it within the VR environment.

9. The system of claim 1 further comprising a button module:
   wherein said button module includes program instructions to create a button within the VR environment which is operatively associated with objects and/or media stored by the media module; and
   wherein the user can press the button within the VR environment to activate the object and/or media.

10. The system of claim 1 further comprising a recessed button module:
    wherein said recessed button module includes program instructions to obtain a digital blueprint of an area on the desk or table in the real-world environment;
    wherein the motion capture device recognizes a gesture executed by the hand of the user across the recessed area on the desk or table and creates the digital blueprint of the recessed area using the gesture; and
    programming instructions to create a copy of the recessed area within a VR environment based on the digital blueprint;
    programming instructions to create a recessed button within the VR environment which is operatively associated with objects and/or media stored by the media module; and
    wherein the user can press the recessed button within the VR environment to activate the object and/or media.

11. A method for providing a virtual reality (VR) online meeting platform comprising the steps of:
    providing a system comprising:
       one or more processors, a computer readable memory and a computer readable storage medium operatively associated with a computing device;
       a motion capture device capable of recognizing and detecting a hand of a user and movement and gestures by the hand;
       programming instructions to create a copy of the hand within a virtual reality environment based on data collected by the motion capture device;
       programming instructions to obtain a digital blueprint of a desk or table in a real-world environment;
    creating a hand within the VR environment based on data collected by the motion capture device;
    obtaining a digital blueprint of the desk or table in a real-world environment by using the motion capture device to recognize a gesture executed by the hand of the user across the desk or table; and
    creating a copy of the desk or table within a VR environment based on the digital blueprint using programming instructions to create a copy of the desk or table.

12. The method of claim 11 wherein the motion capture device is operatively associated with a VR headset worn by the user.

13. The method of claim 11 wherein two or more users each use the system to individually create a copy of a desk or table within the VR environment and those individual desks or tables are then combined within the VR environment to create a shared desk or table.

14. The method of claim 11 further comprising a media module, wherein said media module includes program instructions permitting a user to select media that they can store, view, and share with other users within the VR environment.

15. The method of claim 14 wherein the media includes: pictures, paintings, photos, videos, games, 3D objects, articles, or books.

16. The method of claim 11 further comprising a selection module:
wherein said selection module includes program instructions permitting a user to select an object or media within the VR environment and wherein the motion capture device recognizes a gesture executed by the hand of the user and selects the object or media using the gesture.

17. The method of claim 11 further comprising a tether module:
wherein said tether module includes program instructions permitting a user to tether an object or media previously selected using the selection module and wherein the motion capture device recognizes a gesture executed by the hand of the user and tethers the object or media using the gesture; and
program instructions permitting the user to pull the object or media within reach of the virtual hand of the user in the VR environment.

18. The method of claim 11 further comprising a viewing module:
wherein said viewing module includes program instructions permitting a user to select media stored by the media module and view it within the VR environment.

19. The method of claim 11 further comprising a button module:
wherein said button module includes program instructions to create a button within the VR environment which is operatively associated with objects and/or media stored by the media module; and
wherein the user can press the button within the VR environment to activate the object and/or media.

20. The method of claim 11 further comprising a recessed button module:
wherein said recessed button module includes program instructions to obtain a digital blueprint of an area on the desk or table in the real-world environment;
wherein the motion capture device recognizes a gesture executed by the hand of the user across the recessed area on the desk or table and creates the digital blueprint of the recessed area using the gesture; and
programming instructions to create a copy of the recessed area within a VR environment based on the digital blueprint;
programming instructions to create a recessed button within the VR environment which is operatively associated with objects and/or media stored by the media module; and
wherein the user can press the recessed button within the VR environment to activate the object and/or media.

* * * * *